US010496538B2

(12) United States Patent
Jain et al.

(10) Patent No.: US 10,496,538 B2
(45) Date of Patent: Dec. 3, 2019

(54) SYSTEM, METHOD AND MECHANISM TO EFFICIENTLY COORDINATE CACHE SHARING BETWEEN CLUSTER NODES OPERATING ON THE SAME REGIONS OF A FILE OR THE FILE SYSTEM BLOCKS SHARED AMONG MULTIPLE FILES

(71) Applicant: Veritas Technologies LLC, Mountain View, CA (US)

(72) Inventors: Sanjay Jain, Pune (IN); Anindya Banerjee, Pune (IN); Shirish Vijayvargiya, Pune (IN); Abhishek Gupta, Jharkhand (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 14/840,701

(22) Filed: Aug. 31, 2015

(65) Prior Publication Data

US 2017/0004083 A1 Jan. 5, 2017

(30) Foreign Application Priority Data

Jun. 30, 2015 (IN) .......................... 2486/MUM/2015

(51) Int. Cl.
*G06F 17/30* (2006.01)
*G06F 12/0817* (2016.01)
(Continued)

(52) U.S. Cl.
CPC ........ *G06F 12/0817* (2013.01); *G06F 12/084* (2013.01); *G06F 12/0813* (2013.01); *G06F 2212/621* (2013.01)

(58) Field of Classification Search
CPC . G06F 12/084; G06F 12/0846; G06F 12/0897
See application file for complete search history.

(56) References Cited

U.S. PATENT DOCUMENTS 5,893,160 A 4/1999 Loewenstein
6,996,674 B2 * 2/2006 Chiu .................. G06F 11/2089
709/201

(Continued)

OTHER PUBLICATIONS

Jagtap, Bhushan et al. et al., "Using Owner Nodes to Facilitate Coherency Across Disjoint Caches in Clustered Environments"; U.S. Appl. No. 15/476,447, filed Mar. 31, 2017; consisting of Specification, Claims, Abstract, and Drawings (35 pages).

*Primary Examiner* — Ryan Bertram
*Assistant Examiner* — Trang K Ta
(74) *Attorney, Agent, or Firm* — Campbell Stephenson LLP

(57) ABSTRACT

Various systems, methods and apparatuses for coordinating the sharing of cache data between cluster nodes operating on the same data objects. One embodiment involves a first node in a cluster receiving a request for a data object, querying a global lock manager to determine if a second node in the cluster is the lock owner of the data object, receiving an indication identifying the second node as the lock owner and indicating that the data object is available in the second node's local cache, requesting the data object from the second node, and then receiving the data object from the second node's local cache. Other embodiments include determining whether the lock is a shared lock or an exclusive lock, and either pulling the data object from the local node of the second cache or receiving the data object that is pushed from the second node, as appropriate.

18 Claims, 7 Drawing Sheets

(51) Int. Cl.
    *G06F 12/0813*    (2016.01)
    *G06F 12/084*    (2016.01)

(56) References Cited

U.S. PATENT DOCUMENTS

| | | | |
|---|---|---|---|
| 2002/0174305 A1* | 11/2002 | Vartti | G06F 12/0815 |
| | | | 711/145 |
| 2003/0097531 A1 | 5/2003 | Arimilli | |
| 2003/0131201 A1 | 7/2003 | Khare | |
| 2004/0202013 A1* | 10/2004 | Dove | G06F 9/526 |
| | | | 365/154 |
| 2007/0185872 A1* | 8/2007 | Ho | G06F 9/526 |
| 2013/0275543 A1 | 10/2013 | Jain | |
| 2014/0130055 A1 | 5/2014 | Guha | |
| 2014/0173185 A1* | 6/2014 | Belluomini | G06F 11/1415 |
| | | | 711/103 |
| 2014/0173213 A1 | 6/2014 | Beveridge | |
| 2014/0258224 A1* | 9/2014 | Song | G06F 17/30289 |
| | | | 707/610 |
| 2014/0297611 A1 | 10/2014 | Abbour | |
| 2015/0081945 A1* | 3/2015 | Cheng | G06F 12/0871 |
| | | | 710/313 |
| 2015/0169497 A1* | 6/2015 | Fried | G06F 12/0822 |
| | | | 709/214 |
| 2016/0092488 A1* | 3/2016 | Sun | G06F 17/30348 |
| | | | 707/690 |
| 2016/0162562 A1 | 6/2016 | Hattori | |
| 2016/0246717 A1 | 8/2016 | Patil | |
| 2017/0083362 A1 | 3/2017 | Busaba | |
| 2017/0116095 A1 | 4/2017 | Schatz | |
| 2017/0168939 A1 | 6/2017 | Jalal | |
| 2017/0371787 A1 | 12/2017 | Kalyanasundharam | |
| 2018/0143905 A1 | 5/2018 | Roberts et al. | |

\* cited by examiner

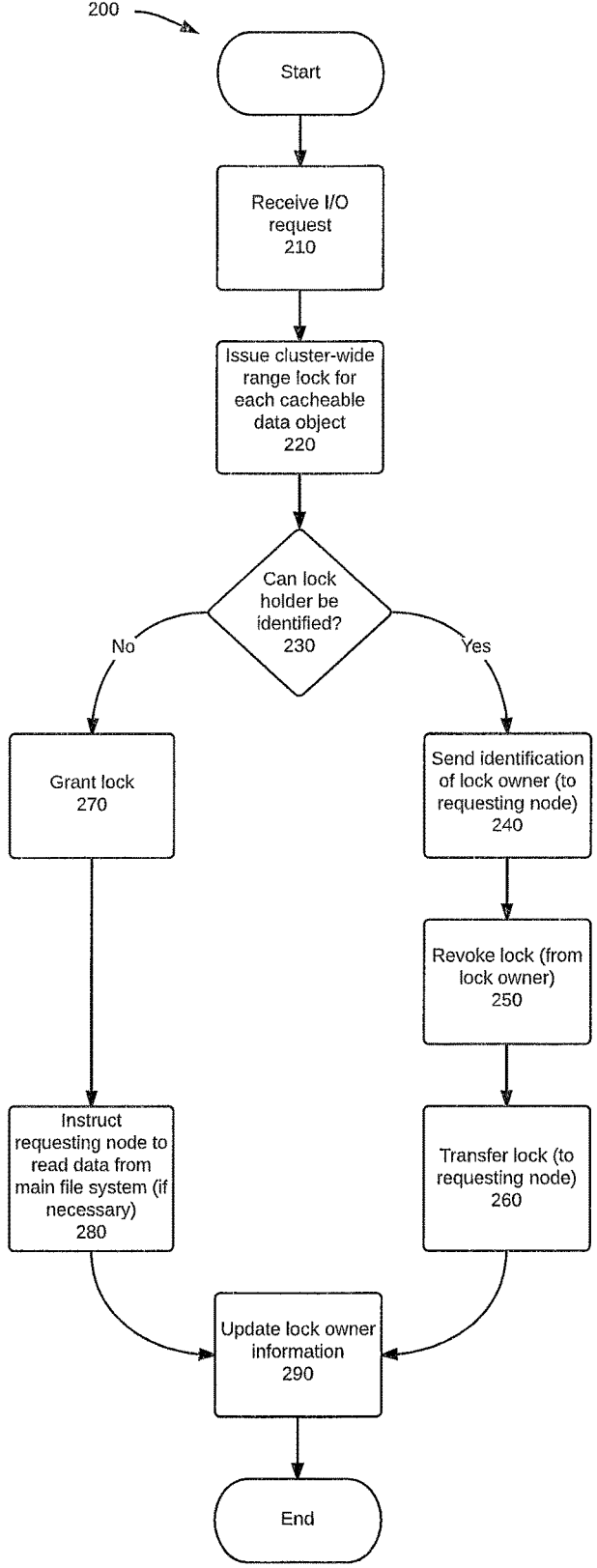

SYSTEM, METHOD AND MECHANISM TO EFFICIENTLY COORDINATE CACHE SHARING BETWEEN CLUSTER NODES OPERATING ON THE SAME REGIONS OF A FILE OR THE FILE SYSTEM BLOCKS SHARED AMONG MULTIPLE FILES

CROSS-REFERENCE TO RELATED APPLICATIONS

This application claims benefit under 35 U.S.C. § 119(a) of pending Indian Provisional Patent Application No. 2486/MUM/2015, filed in India on Jun. 30, 2015, entitled "System, Method and Mechanism to Efficiently Coordinate Cache Sharing Between Cluster Nodes Operating on the Same Regions of a File or the File System Blocks Shared Among Multiple Files," and having Sanjay Jain, Anindya Banerjee, Shirish Vijayvargiya, and Abhishek Gupta as inventors. The above-referenced application is hereby incorporated by reference herein, in its entirety and for all purposes.

FIELD OF THE INVENTION

This disclosure relates to the sharing of data between nodes in a cluster, and more specifically provides for efficiently coordinating the sharing of cache data between cluster nodes operating on the same data objects, such as files or regions of files.

DESCRIPTION OF THE RELATED ART

In a clustered environment, multiple nodes may potentially attempt to access a single file (or other quantum of data) within close temporal proximity to each other. Current systems require each node to retrieve the data from the main file system every time the node wants to access that data, except for the situation when the data is already in the requesting node's cache. Accessing data from the main file system can create bottlenecks, and is comparatively much slower than accessing data from a cache, for at least two reasons. First, disk access speed is generally on the order of milliseconds ($10^{-3}$ seconds), whereas cache access speed is generally on the order of microseconds ($10^{-6}$ seconds). Thus, cache access times can be on the order of 1000-times faster than disk access times. Second, accessing data from a main file system generally requires the traversal of multiple networks, which increases the amount of time required to retrieve such data. Unfortunately, current systems do not allow the avoidance of duplicate I/O requests to the main file system, even if the requested data is already cached on a different node within the same cluster.

SUMMARY OF THE INVENTION

Provided herein are various methods and systems for coordinating cache sharing between cluster nodes that are operating on the same body of data. One embodiment involves a first node in a cluster receiving a request for a data object, querying a global lock manager to determine if a second node in the cluster is the lock owner of the data object, receiving an indication identifying the second node as the lock owner and indicating that the data object is available in the second node's local cache, requesting the data object from the second node, and then receiving the data object from the second node's local cache. Other embodiments include determining whether the lock is a shared lock or an exclusive lock, and either pulling the data object from the local node of the second cache or receiving the data object that is pushed from the second node, as appropriate.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

FIG. 2 is a flowchart that illustrates the use of a cluster-wide range lock, in accordance with one embodiment.

DETAILED DESCRIPTION

Introduction

Figure 1A:
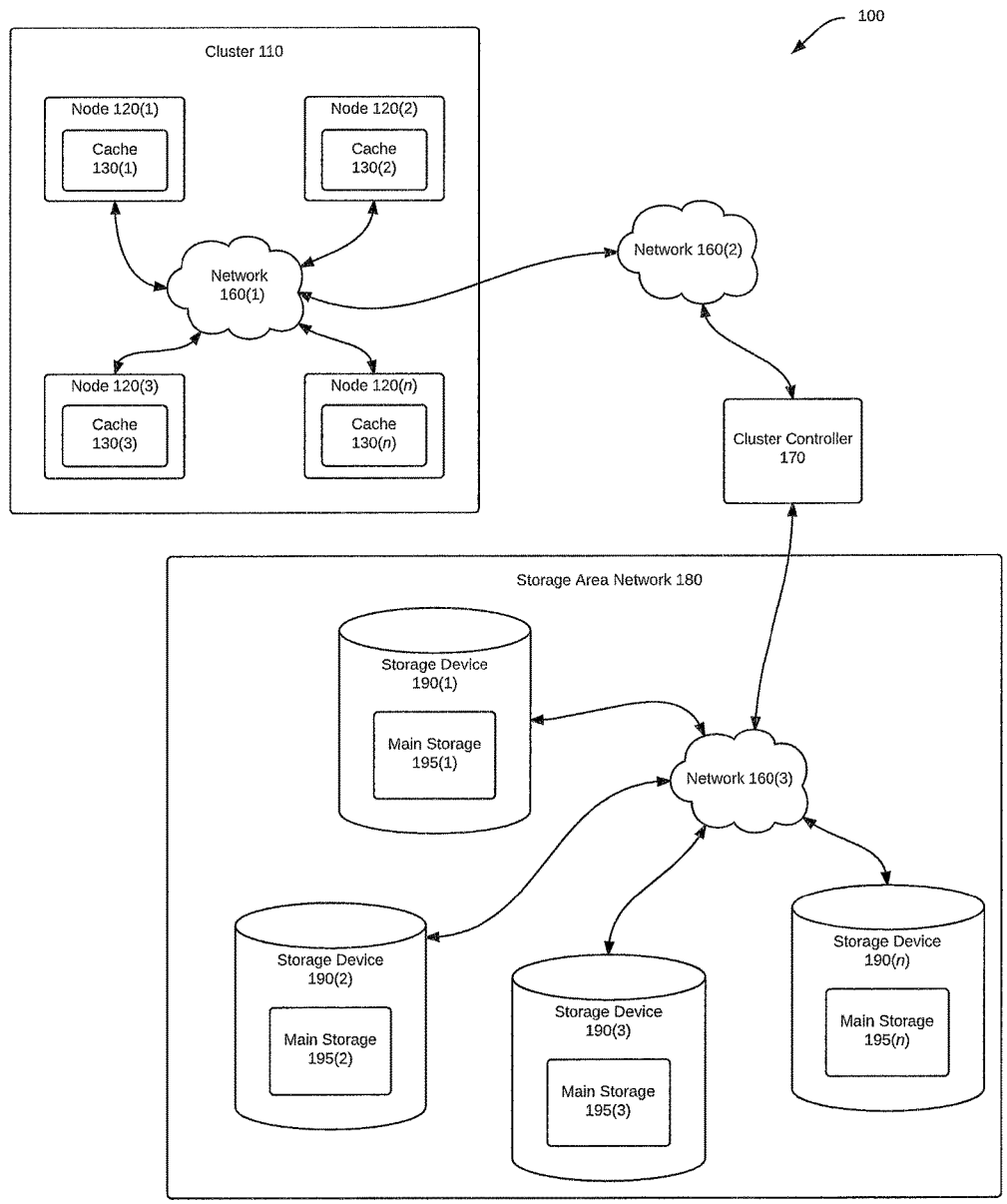
FIG. 1A is a block diagram of a network file system, including one or more computing system(s) node(s) of a cluster connected via a network to each other and via a network to one or more storage device(s) of a storage area network, according to one embodiment.

As provided in this disclosure, data can be accessed faster and more efficiently by obtaining the data from the cache of another node in the same cluster (e.g., a local cache), rather than by accessing a hard disk and/or the main file system to obtain that data. Accordingly, the systems, methods and techniques provided herein can be used to minimize duplicate disk requests by efficiently obtaining requested data from the cache of another node in the same cluster (e.g., a local cache) whenever possible. The disclosure provided herein provides mechanisms that make it possible to determine which cluster node, if any, has the desired data stored in its cache (e.g., a local cache). More specifically, the instant disclosure enables cluster nodes to determine whether any other node in its cluster has the desired file data cached, and if so retrieve that file data from the other node's cache (e.g., a local cache) without having to access the main file system to obtain that file data. This disclosure further enables the sharing of desired data across multiple files, such as in the case of deduplicated data that is shared among multiple files.

In order to achieve these results, the disclosure provided herein provides techniques for associating a cluster-wide range lock with cacheable data object(s) in a cluster. This disclosure further enables cache sharing among multiple nodes, even if the same object is being accessed with respect to different files on different nodes (e.g., in the case of multiple files sharing the same block (or page) or extent of data). Additionally, this disclosure provides a "push" model for obtaining data from a shared cache, which can be used when at least one of the nodes sharing the cache either has, or wants to obtain, an exclusive (write) lock on the data. This disclosure also provides a more efficient "pull" model for obtaining data from a shared cache, which can be used where all of the nodes sharing the cache either have, or are requesting, a shared (read) lock on the data.

Because accessing data from another node's cache is faster than getting data through a duplicate disk request (e.g., to a SAN), this disclosure provides a mechanism by which the requesting node can determine which node in the cluster has a cached copy of the desired data, which thus enables the requesting node to access/retrieve that desired data directed from the other node's cache without having to issue a duplicate disk request. In one embodiment, a global lock manager can determine whether accessing/retrieving the desired data will take less time if the data is accessed/retrieved from another node's cache than if that desired data is retrieved from main storage. In another embodiment, the global lock manager can assume that accessing/retrieving the data from another node's cache will always take less time than accessing/retrieving that same data from main storage. In certain embodiments, the functionality disclosed herein can be performed within the context of a network file system containing clustered nodes, such as the network file system described in relevant part below.

Network File System

FIG. 1A is a block diagram of a network file system 100 including a cluster 110 of nodes 120(1)-120(n) (collectively, "nodes 120"), which are connected to each other via network 160(1). Each node of nodes 120 contains a respective cache among caches 130(1)-130(n) (collectively, "caches 130"). While more details about cluster 110 and its components will be provided in FIG. 1B and the accompanying discussing, for purposes of the instant discussion nodes 120 can be any computing system that is capable of functioning, or being configured to function, in accordance with the disclosure provided herein. Similarly, caches 130 can be any type of cache that is capable of functioning, or being configured to function, in accordance with the disclosure provided herein Importantly, caches (such as caches 130) provide faster access to data than hard disks (such as main storage 195(1)-195(n), which are discussed in more detail below) and also avoid the need to traverse multiple networks in order to retrieve and/or access that data.

Although other embodiments and configurations are possible, the network file system shown in FIG. 1A depicts one common multi-network file system environment. To that end, FIG. 1A depicts a second network, network 160(2), which is used to connect cluster 110 to a cluster controller 170, and eventually to storage area network (SAN) 180 via a third network, that being network 160(3). SAN 180 can be any storage area network, and can include components other than, and in addition to, the components that are expressly depicted in FIG. 1A. Nevertheless, SAN 180 depicts certain components of a storage area network that are necessary to the discussion provided in this disclosure.

In particular, SAN 180 is depicted as including multiple storage devices, which are shown as storage devices 190(1)-190(n) (collectively, "storage devices 190"). Storage devices 190 can be any type of storage device, such as a data node or other computing system, that is capable of interfacing with a network and containing a main storage component. Storage devices 190 each contain a data store that is referred to herein as a main storage, and which are depicted in FIG. 1A as main storage 195(1)-195(n) (collectively, "main storage 195"). Each unit of main storage 195 can be any sort of non-transient, computer-readable storage medium that is capable of storing data and retaining data even when powered down. As such, main storage 195 can be, e.g., a hard disk drive or a non-volatile solid state drive. Main storage 195, however, is intended to be distinct from a cache (although storage devices 190 may also contain a separate cache, even though such a cache is not depicted in FIG. 1A). Among other distinctions, a cache has significantly faster access times than a main storage. By way of example, currently-available caches have access times that are generally on the order of microseconds ($10^{-6}$ seconds), whereas currently-available hard disks have access times that are generally on the order of milliseconds ($10^{-3}$ seconds). This difference is significant, particularly in light of the problems being addressed by this disclosure.

The letter n is used to indicate a variable number of devices or components. For example, a variable number of user computers are implemented in the system described above. Although the letter n is used in describing a variable number of instances of various and occasionally different devices and components, a repeated use of the letter n does not necessarily indicate that each device and/or component has a same number of n instances implemented in any given system.

Figure 1B:
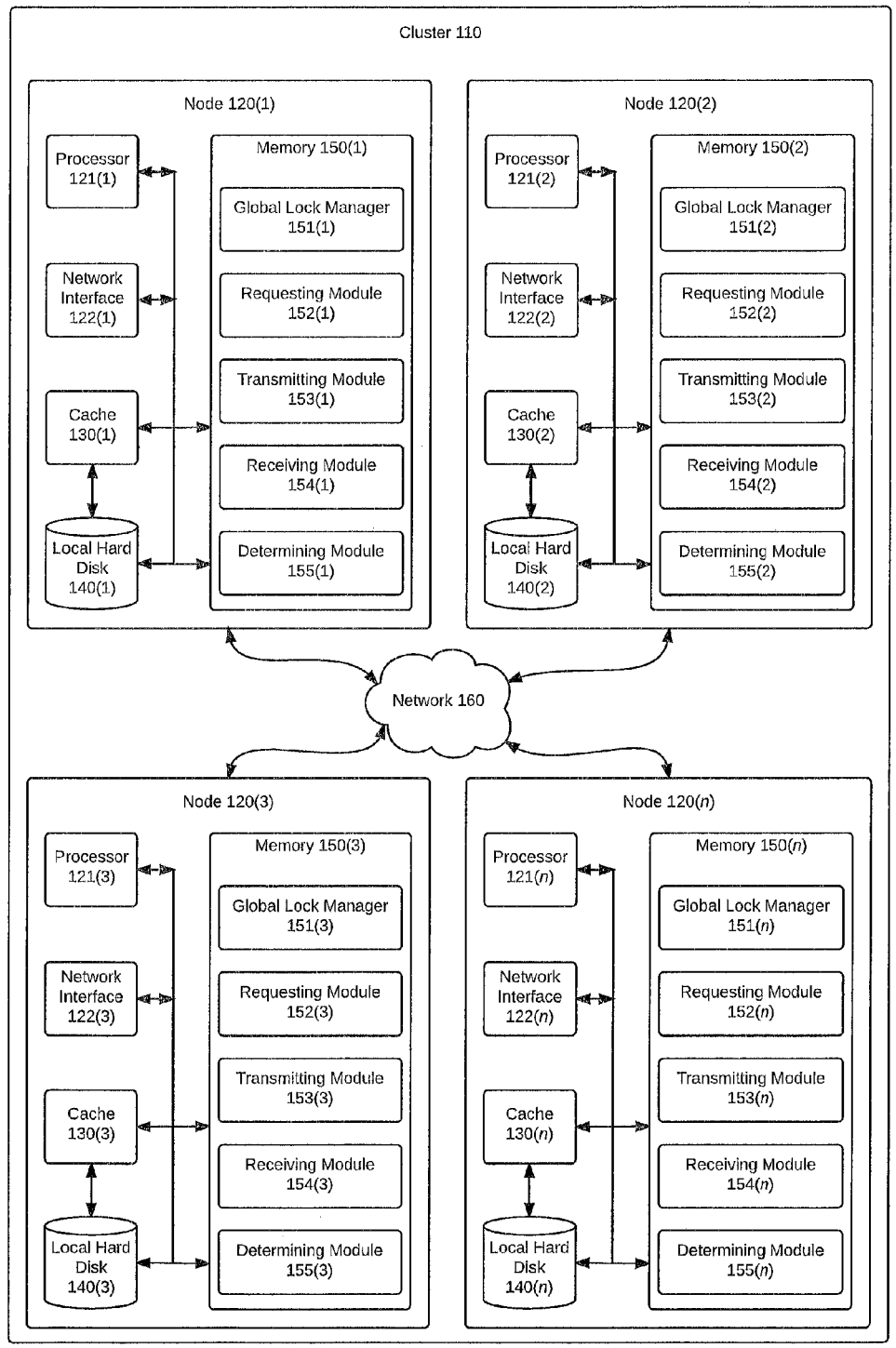
FIG. 1B is a block diagram of a network file system, providing additional details of nodes of a cluster, according to one embodiment.

FIG. 1B is a block diagram containing additional details regarding cluster 110 and nodes 120. As shown in FIG. 1B, each node 120(1)-120(n) includes a respective processor 121(1)-121(n) (collectively, "processors 121") and a respective network interface 122(1)-122(n) (collectively, "network interfaces 122"). Each node 120(1)-120(n) also includes a respective cache 130(1)-130(n) and a respective local hard disk 140(1)-140(n) (collectively, "local hard disks 140"). Similar to the distinctions mentioned above with respect to main storage 195, caches 130 are also distinct from local hard disks 140. Each local hard disk 140 can be any sort of non-transient, computer-readable storage medium that is capable of storing data and instructions, and retaining the stored data and instructions even when powered down. As such, local hard disks 140 can be, e.g., a hard disk drive or a non-volatile solid state drive. Local hard disks 140, however, are intended to be distinct from caches 130. Among other distinctions, each of caches 130 has a significantly faster access time than local hard disks 140. By way of example, currently-available caches have access times that are generally on the order of microseconds ($10^{-6}$ seconds), whereas currently-available hard disks have access times that are generally on the order of milliseconds ($10^{-3}$ seconds). This difference is significant, particularly in light of the problems being addressed by this disclosure.

In addition to the components mentioned above, each of nodes 120 contains a respective memory 150(1)-150(n) (collectively, "memories 150"). Each memory 150 can be any sort of non-transient, computer-readable storage medium that is capable of storing data and retaining data even when powered down. Additionally, each of memories 150 should be configured to, or capable of, storing one or more software programs or software modules. Although depicted separately from local hard disks 140 for ease of discussion herein, in practice memories 150 may be included in a respective local hard disk 140, or they may be separate components.

As shown in FIG. 1B and mentioned above, each of memories 150 is shown as containing a global lock manager 151(1)-151(n) (collectively, "global lock managers 151") as well as multiple software modules, which will be discussed in more detail below. As discussed herein, global lock managers 151 can be software (e.g., an application, program, module, or the like) that is capable of performing the functionality discussed herein, specifically including all (or at least some of) the functionality discussed in conjunction with the discussion accompanying FIG. 2, below. Moreover, global lock managers 151 are also capable of performing various functionality depicted in the other Figures included in this specification, as appropriate. Although global lock managers 151 are depicted in a distributed manner herein, in other embodiments each node 120 does not necessarily have to include a global lock manager 151 within that node's respective memory 150. In one embodiment, a single global lock manager 151 may serve as the global lock manager for two or more (or even all) of the nodes 120 in cluster 110. Moreover, each of global lock managers 151 depicted in FIG. 1B are configured to communicate with each other. This communication is necessary to effectively and efficiently coordinate and share information about which node(s) of nodes 120 contain a requested range of data within that node's respective cache 130.

As alluded to above, one or more global lock managers 151 within cluster 110 can be used to keep track of which node(s) 120 have the lock for each cacheable data object within cluster 110, as well as the type of lock (e.g., a shared (read) lock or an (exclusive) write lock) that is currently applied to each such cacheable data object. (Cacheable data objects and locks will be discussed in more detail below, and throughout this disclosure.) Global lock managers 151 can store information regarding the current lock owner(s) for each cacheable data object in a non-transient, computer-readable storage medium ("memory"), such as RAM, a hard disk, flash memory, a solid-state drive, or any other form of computer memory that is configured to store such information. Such memory can be included within the global lock manager itself, within the node 120 that includes each respective global lock manager 151 (such as within the respective local hard disk 140 or the respective memory 150), or within a device that is communicatively-coupled to a global lock manager 151. Among other functionality, global lock managers 151 can store information about each data object, as well as information about the node or nodes 120 that own(s) the current lock on that data object.

Although not expressly depicted herein, each cache 130 can organize its respective storage space into files, each of which can include pages, blocks, and/or extents. As used herein, a page and a block are largely interchangeable terms. Each page or block includes a certain number of bytes of storage space (regardless of whether those bytes contain data or are empty, for example). While the specific number of bytes in a page or block can vary from system to system, the number of bytes in a page (i.e., the "page size") or a block (i.e., the "block size") will generally remain the same within a given system, or at least within a given node 120. An extent includes a specific number of consecutive or contiguous pages or blocks. As was the case with page sizes and block sizes, the specific number of pages or blocks that are included in an extent may vary from system to system, but that number will generally remain consistent within a system, or at least within a given node 120. Similar to extents, a range may include a number of consecutive or contiguous pages or blocks. Unlike extents, however, a range need not include a specific number of pages or blocks, and the number of pages or blocks included within any given range can thus vary from range to range, even within a system or within a node 120.

A cacheable data object can be any data that is stored in a cache managed by a file system, for example, page cache data (e.g., a region of a file cached in the page cache), buffer cache data, SSD cache data, or a data block (or page) or extent of data blocks (or pages) shared among multiple files. In one embodiment, a cacheable data object will include a range of consecutive pages or blocks. In other embodiments, a cacheable data object can include any number of blocks, pages, or extents.

As will be discussed in more detail below, a cluster-wide range lock may be taken on a specific range of data and/or a specific cacheable data object. The instant disclosure is primarily focused on shared (read) locks and exclusive (write) locks. An exclusive (write) lock prevents all other nodes 120 within cluster 110 from reading or writing to that data or cacheable data object during the pendency of the lock, and also enables the current lock owner to both read and write to that data or cacheable data object during the pendency of the lock. Conversely, a read lock is a shared lock. A shared (read) lock can be used when reading, for example, a given quantum of data is shared among multiple files, such as in the case of deduplicated data that is shared among multiple files. As explained in more detail below, other requirements may be necessary for a shared (read) lock to be appropriate in any given situation. As a result, more than one node can access data or a cacheable data object that is subject to a shared (read) lock without having to wait for a previous lock owner to relinquish that lock. Moreover, as discussed in more detail below, in certain situations a requesting node can "pull" a copy of data that is subject to a shared (read) lock and store that data in its own cache, even prior to the current lock owner releasing the shared (read) lock. As such, in this "shared mode," multiple nodes may each have an identical local copy of that data in its cache. However, no node can obtain an exclusive (write) lock on data that is subject to a shared (read) lock until after every shared (read) lock(s) has been relinquished with respect to that data.

As alluded to above, each memory 150 can also contain one or more software modules (in addition to global lock managers 151). As shown in the embodiment depicted in FIG. 1B, each memory 150 contains can include requesting modules 152(1)-152(n) (collectively, "requesting modules 152"), transmitting modules 153(1)-153(n) (collectively, "transmitting modules 153"), receiving modules 154(1)-154(n) (collectively, "receiving modules 154"), and determining modules 155(1)-155(n) (collectively, "determining modules 155"). Each of these modules can include one or more sets of instructions encoded in software (e.g., a program, application, or portion thereof) that are configured to perform one or more steps of methods 200, 300, and/or 400, each of which is discussed below. Moreover, although shown as distinct elements for ease of the instant discussion, each of these modules can be combined together or separated into further modules, according to a particular embodiment.

Global Lock Manager

FIG. 2 illustrates actions that can be performed by a global lock manager to manage and facilitate the locking and unlocking of data across multiple nodes of a cluster, particularly with respect to data stored in a cache of one or more nodes in that cluster, according to one embodiment. In one embodiment, the steps of method 200 can be performed by a global lock manager (GLM), such as any of the global lock managers 150. Method 200 can begin at 210, when an I/O request is received. Although not required, this I/O request can be received from a different node other than the node that is granted the lock in step 220, below. In one embodiment, the I/O request can be received by a cluster controller. The I/O request can also be received by any other device that is configured to receive such a request, e.g., a node within a cluster, such as any of nodes 120. The I/O request can also be received by, or communicated to, one or more global lock managers, such as global lock managers 151.

Method 200 can issue a cluster-wide range lock for each cacheable data object in step 220. A cluster-wide range lock can be granted for each cacheable data object in response to a node issuing either a read request or a write request with respect to a given cacheable data object. In certain embodiments, a range lock can cover one or more entire cacheable data objects, or a range of data (e.g., a block range or byte range) within one or more cacheable data objects. In certain embodiments, method 200 can be performed without step 220 being performed. As one example, the I/O request received in step 210 may be a request for a data object that was not subject to a previous I/O request (or at least not to an I/O request that was recent enough for the object to still be cached), in which case that data object would not be locked at that point in time.

Upon receiving an I/O request, a global lock manager can determine in step 230 whether the current lock owner can be identified. A lock owner can be a node (or other device) or process that currently has been given either an exclusive lock or a shared lock on a given cacheable data object. An exclusive lock can also be referred to as a write lock. An exclusive (or write) lock can be associated with a cacheable data object, and can be granted before a node is allowed to write data to that cacheable data object. Because this type of lock is exclusive, no other nodes can read, write, or otherwise access the data subject to an exclusive write lock until the exclusive write lock has been relinquished or otherwise removed or revoked. A shared lock can also be referred to as a read lock. A shared (or read) lock can be associated with a cacheable data object, and can be granted before a node is allowed to read data from that cacheable data object. Because this type of lock can be shared among two or more nodes, other nodes may also be allowed to read the data subject to a shared read lock without having to obtain an exclusive lock to that data. In the case of a shared (read) lock, however, none of the nodes sharing that lock will be granted permission to write (or re-write) the data while that data remains subject to the shared lock. If a node wants to write to that data, the node must wait until all of the shared lock owners have relinquished their respective locks, at which point the node requesting to write to that data may be issued an exclusive (write) lock.

If the lock owner is identified in 230, then a global lock manager can send an indication to the requesting node in 240. This indication can include information that identifies the node that is the current lock owner. Such information can be, e.g., a node name or network address of the lock owner node. In step 250, a global lock manager can issue a command to revoke the lock from the lock owner node. As will be discussed elsewhere, step 250 is generally not necessary in the scenario where the current lock is a shared (read) lock and the I/O request is a read request. Assuming that a command to revoke the lock was issued in step 250, that command can be received by the current lock owner, which can then perform steps to relinquish that lock, such as the steps discussed elsewhere in this disclosure. After issuing the command to revoke the lock in step 250 (if such a command was issued), a global lock manager can then transfer (i.e., grant) the lock to the requesting node (i.e., the node that issued the I/O request) in step 260. As was the case with step 250, step 260 is also generally not necessary in the scenario where the current lock is a shared (read) lock and the I/O request is a read request.

If the lock owner cannot be identified in step 230, then a global lock manager can grant the lock to the requesting node in step 270 without the need to first revoke the lock from any other node. If a lock owner could not be identified in step 230, then step 270 may also require retrieving the data from a main storage in step 280. Main storage may be a storage area network (SAN), such as SAN 180, or a hard disk that is part of the cluster or another network. In any event, retrieving data from main storage and/or a hard disk will take significantly more time that retrieving that same data from another node's cache. As explained above, reading the data from a cache can be on the order of 1,000-times faster than reading the data from a hard disk, and this discrepancy only increases when network lag times are factored into the analysis. As a result, reading the data from main storage and/or a hard disk should be avoided whenever possible. Fortunately, avoiding such bottlenecks is made possible by the techniques provided elsewhere in this disclosure, including the remaining portions of method 200.

Upon completing steps 240, 250 and 260, or upon completing steps 270 and 280, a global lock manager can update a memory in 290 to indicate the current lock owner of that particular cacheable data object. Moreover, when granting the lock (via either step 260 or step 270), a global lock manager may send a notification to the requesting node indicating that the requesting node is now the lock owner. If necessary, the global lock manager can also send a notification to the previous lock owner, indicating that the lock has been revoked from the previous lock owner.

Requesting Node

Figure 3:
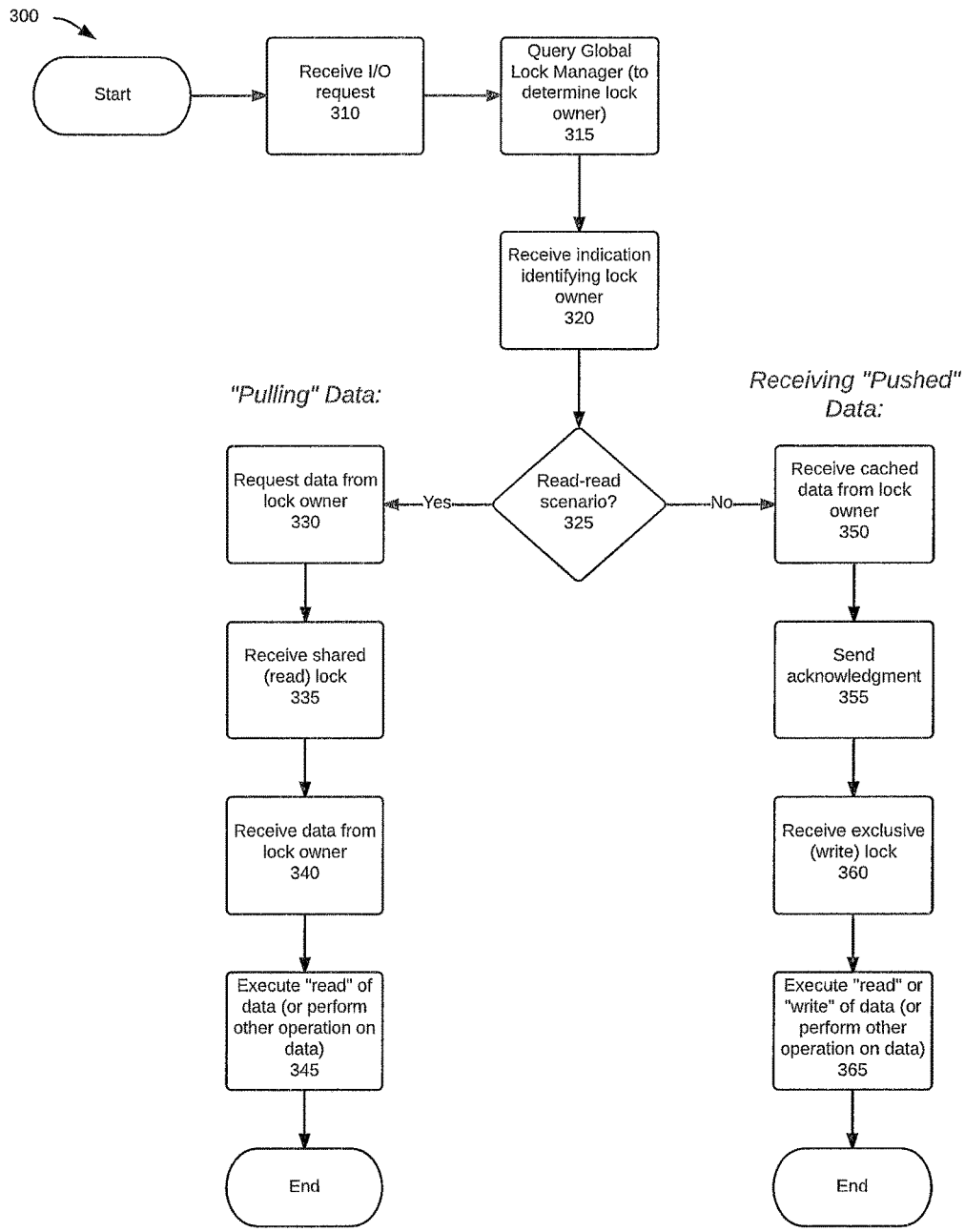
FIG. 3 is a flowchart that illustrates accessing data in a shared cache, according to one embodiment.

FIG. 3 illustrates actions that can be performed by a node that is requesting access to data, according to one embodiment. In one embodiment, steps of method 300 can be performed by one or more nodes that are part of a cluster (including any modules contained therein, such as, e.g., requesting modules 152, transmitting modules 153, receiving modules 154, and determining modules 155), such as any of nodes 120. In step 310, a node (or other device) receives an I/O request. The I/O request can be received from any system, program, or process that is capable of issuing such an I/O request, such as any of nodes 120, an application program that is requesting access to the data, or a computer process (e.g., thread) that is requesting access to the data. This I/O request can include a request to "read" the data object and/or a request to "write" to the data object. A read request is a request to read data and potentially make use of that data, but without changing or modifying the data. A write request is a request to change or modify the data, and which may or may not include reading the data prior to changing or modifying that data.

In step 315, the node that is requesting access to the cacheable data object (i.e., the "requesting node") can query a global lock manager to determine what node is the current lock owner for the cacheable data object that is subject to the I/O request. In step 320, the requesting node can receive an indication identifying the current lock owner for the cacheable data object at issue. In one embodiment, this indication can be received from a global lock manager, such as one of global lock managers 151.

At step 325, method 300 determines whether the I/O request received in step 310 is a read request for a cacheable data object that is already subject to a read (shared) lock (referred to herein as "read-read" scenario) that is owned by a different node. In one embodiment, determination 300 can be made by a global lock manager, such as one of global lock managers 151. If the I/O request creates a "read-read" scenario, the node that issued the I/O request in 310 can "pull" the data from another node, as shown in steps 330 through 345. If the I/O request creates either a "read-write" situation, a "write-read" scenario, or a "write-write" scenario, then the node that issued the I/O request in 310 must receive data that is "pushed" from the lock owner, as shown in steps 350 through 365, prior to reading from or writing to that cacheable data object. The terms "read-write," "write-read," and "write-write" will be explained in further detail below, in conjunction with the explanation of a "push request."

Pull Request

If the request is determined to create a read-read scenario in step 325, method 300 proceeds to step 330. As indicated above, steps 330 through 350 provide a method of "pulling" the data from the cache of a different node, which is referred to herein as the "lock owner." This sub-method begins at step 330, where the requesting node can request a copy of the data from the current lock owner. In step 335, the requesting node can receive a shared (read) lock for the cacheable data object at issue. In step 340, the requesting node also receives a copy of the data from the cache of the lock owner. After the requesting node receives the shared (read) lock in step 335 and the data in step 340, the requesting node can execute a "read" operation or perform a different operation on that data in step 345. In other embodiments, steps 315, 320, 325, 330, 335, and 340 may be performed in an order other than the order expressly listed here.

Push Request

If the request is determined to create something other than a read-read scenario in step 325, method 300 then proceeds to step 350 in order to "push" the cacheable data object from the current (or "original") lock owner to the requesting node. The need to "push" the cacheable data object to the requesting node may occur if the requesting node is making a write request, and/or if the current lock owner has a write (exclusive) lock on the requested cacheable data object. In these situations, at least one of the two nodes requires an exclusive (write) lock on the cacheable data object so that that node can change the data via a write operation. In these scenarios, the data may be changed by either the original lock owner, by the requesting node, or by both nodes. As a result, the requesting node cannot simply "pull" the data from the current lock owner's cache, since the data will be changed by one or both of the nodes during the pendency of their respective locks. Rather than pulling the data, the current lock owner must therefore "push" the data—and transfer the lock—to the requesting node. The current lock owner can only push the data, however, after the current lock owner has completed and committed all transactions being performed by the current lock owner, and the current lock owner is thus ready to release its lock. Although not expressly depicted in FIG. 3, a situation may also arise where multiple nodes have a shared (read) lock on the cacheable data object at the same time. In that situation, each of the nodes would have to complete their respective transaction(s) and relinquish their respective lock before the data can be "pushed" to the requesting node.

As indicated above, steps 350 through 365 provide a method of "pushing" the data from the cache of the current lock owner to the cache of the requesting node. This sub-method begins at step 350, where the requesting node receives the requested data from the lock owner's cache, and the requesting node stores that data in its own cache. After receiving the data, the requesting node sends an acknowledgement (e.g., an "ACK" message or packet) to the lock owner in step 355 in order to indicate that the requesting node has received the data without any errors. As will be discussed in conjunction with FIG. 4, below, the lock owner can release the lock at this point. In step 360, the requesting node can receive an exclusive (write) lock to the data, and the requesting node thus becomes the new lock owner. After receiving the exclusive (write) lock, the requesting node can then execute one or more operations on that data, such as one or more read operation(s) and/or write operation(s) in step 365. In other embodiments, steps 310, 315, 320, 325, 350, 355, and 360 may be performed in an order other than the order expressly listed here.

Lock Owner

Figure 4:
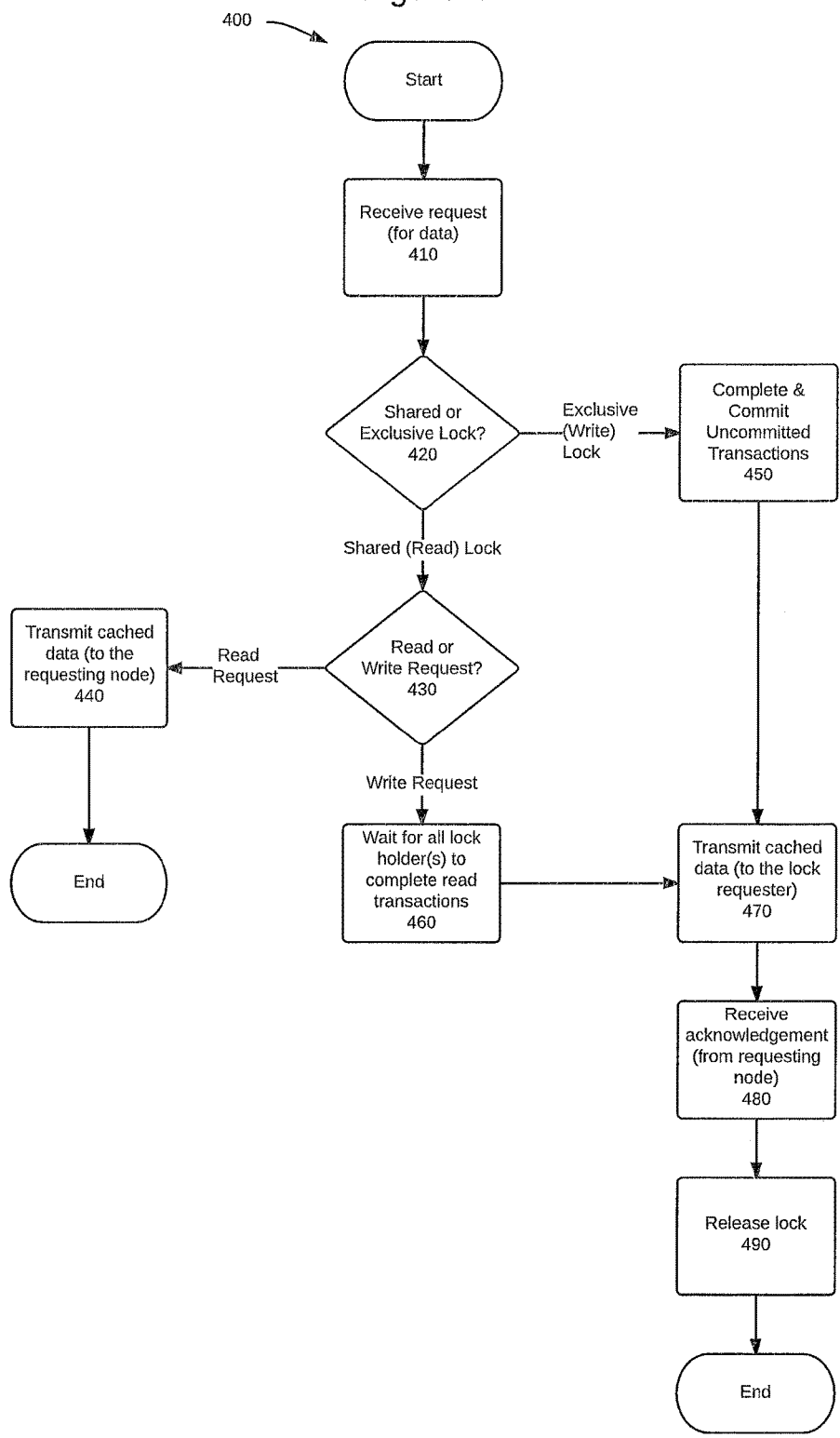
FIG. 4 is a flowchart that illustrates transmitting data from one node's cache to another cache, and transferring a cluster-wide range lock associated with that data when appropriate, according to one embodiment.

FIG. 4 illustrates actions that can be performed by a node that is the lock owner for a cacheable data object, according to one embodiment. In one embodiment, steps of method 400 can be performed by one or more nodes that are part of a cluster (including any modules contained therein, such as, e.g., requesting modules 152, transmitting modules 153, receiving modules 154, and determining modules 155), such as any of nodes 120. In step 410, the lock owner node receives a request for data. In one embodiment, this request can be received from a "requesting node" within the same cluster, with the "requesting node" being the node that sent the request for the data.

Responding to a Pull Request

Upon receiving the request for data in 410, the lock owner node should determine whether the lock owner has a shared (read) lock or an exclusive (write) lock on the data in 420. If the lock owner has a shared (read) lock on the requested data, then the instant transaction may be creating a "read-read" scenario, as described above. In order to determine if this is, in fact, a "read-read" scenario, the lock owner should determine in 430 whether the request received in 410 is a read request or a write request. If the lock owner determines in 430 that the request received in 410 is a read request, then the instant request is a "pull request," as described elsewhere in this disclosure. (In an alternative embodiment, the request received in 410 may indicate directly that the request is a "pull request," in which case method 400 may proceed directly from step 410 to step 440.) In that scenario, method 400 proceeds to step 440, in which step the lock owner transmits the requested data to the requesting node. Prior to transmitting the requested data to the requested node, the lock owner should locate the requested data within its own cache. As indicated elsewhere in this disclosure, accessing the data in this manner can be on the order of 1,000-times faster than accessing the same data from a hard disk. In either scenario, the lock owner does not have to wait for any outstanding transaction(s) to finish prior to transmitting the data, because any outstanding transaction(s) are read-only transactions in this scenario, and thus cannot change the data. As a result, this scenario is more efficient than the scenarios that have a "write" component, as this scenario allows for the data to be transferred to the requesting node without having to wait for any other transactions to complete, and without having to release-and-transfer the lock. Method 400 finishes upon completion of step 440.

Responding to a Push Request

If the lock owner determines in 420 that the lock owner has an exclusive (write) lock on the requested data, then the instant transaction does not create a "read-read" scenario, but rather creates either a "write-read" scenario or a "write-write" scenario. Both of these scenarios are handled in the same manner from this point forward, so there is not need to determine whether the request received in 410 is a read request or a write request prior to proceeding with the remaining steps of method 400. The reason that no such decision is needed is because the exclusive (write) lock gives the lock owner permission to modify the requested data, which causes any copies of that data that may have been stored in the cache of any other nodes to become "stale." As a result, the updated data must be pushed to the requesting node prior to proceeding, regardless of whether the requesting node wants to read the data or write to the data. Moreover, because the data can (and most likely will) change during the pendency of the lock owner's exclusive (write) lock, the data cannot be transmitted to the requesting node until the lock owner node has completed and committed all outstanding transactions on its end, which is shown in step 450. Following step 450, method 400 proceeds to step 470, which is discussed in more detail below.

If the lock owner determines that the lock owner has a shared (read) lock on the requested data in step 420, and further determines in step 430 that the request received in step 410 is a write request, method 400 then proceeds to step 460. In this case, the instant transaction also does not create a "read-read" scenario, but rather creates a "read-write" scenario. Because the requested data is subject to a shared (read) lock, other cluster nodes (in addition to the lock owner) may also have a shared (read) lock on the requested data. As such, the lock owner cannot transmit the data to the requesting node until all current lock owners have finished their respective operation(s) and released their respective lock on the requested data. Waiting in this manner is necessary to avoid creating incoherent copies of the data, which could otherwise happen, e.g., if the requesting node completed and committed all of its write transactions before all of the nodes that had a shared (read) lock finished all of their respective read transactions of that data. This step of waiting for all other current shared (read) lock owners to finish their respective operation(s) and release their respective lock on the requested data is shown in step 460. As was the case following completion of step 450, above, method 400 also proceeds to step 470 following completion of step 460.

Step 470 is essentially identical (at least in function, although not necessarily in purpose) to step 440, which was described above. In step 460, the lock owner transmits the requested data to the requesting node. Prior to transmitting the requested data to the requested node, the lock owner should locate the requested data within its own cache. As indicated elsewhere in this disclosure, accessing the data in this manner can be on the order of 1,000-times faster than accessing the same data from a hard disk.

Unlike the "pull" method described above, the "push" method (as shown in steps 450 through 490) also requires the lock owner to relinquish its lock on the requested data and transfer that lock to the requesting node. This transfer of the lock is accomplished via a three-step process, as shown in steps 470 (described above), 480 and 490. Thus, after transmitted the cached data to the requesting node in 470, the lock owner must wait to receive an acknowledgment from the requesting node in 480, prior to releasing the lock on the requested cached data in 490. The acknowledgment received in 480 can be any type of acknowledgment, such as an "ACK" or other packet, which can be used or configured to indicate that the requesting node received the requested data without encountering any errors. Method 400 then ends following the completion of step 490.

Example Network

As shown above, the systems described herein can be implemented using a variety of computer systems and networks. Examples of such computing and network environments are described below with reference to FIGS. 5 and 6.

Figure 5:
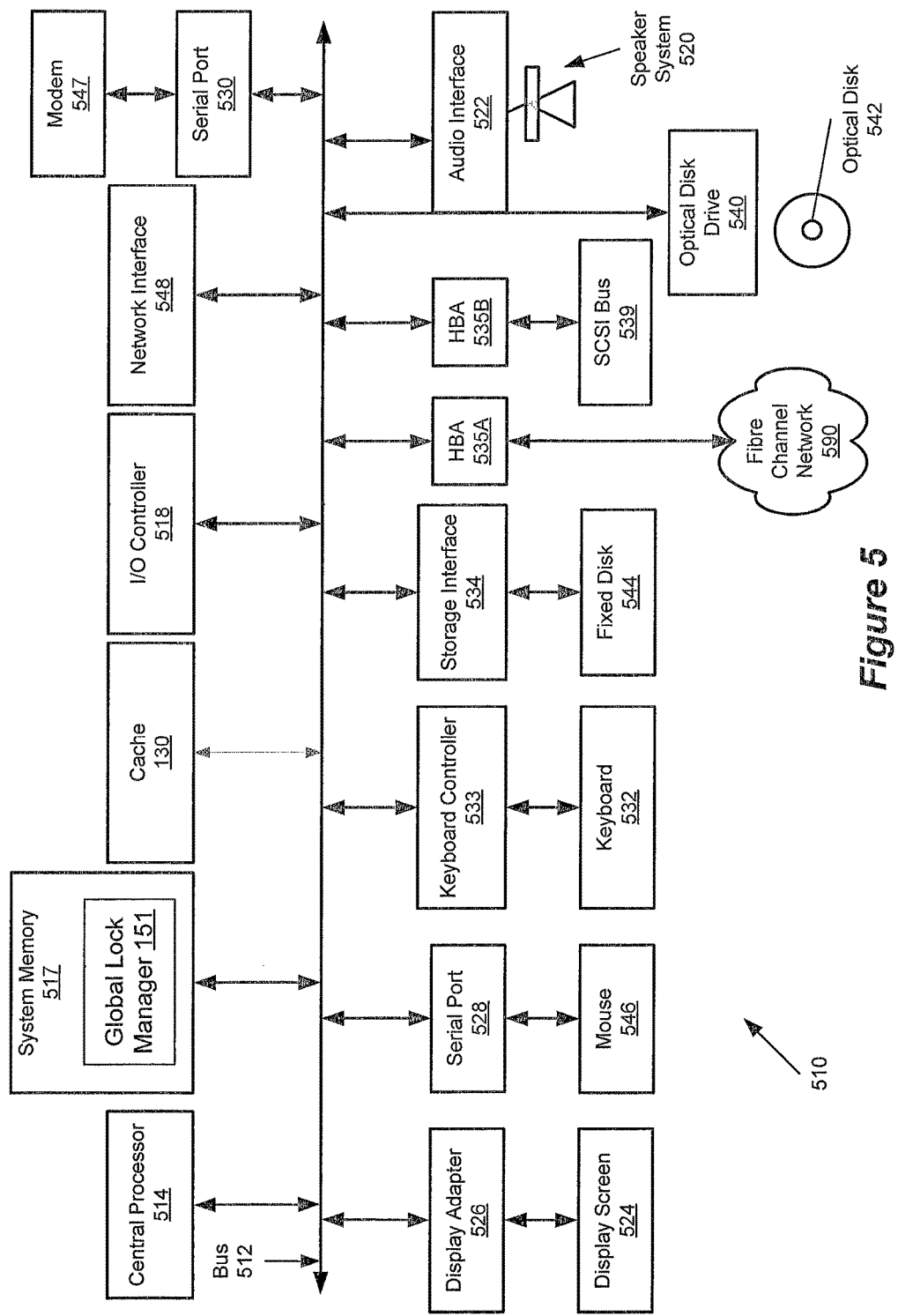
FIG. 5 is a block diagram of a computing device, illustrating how certain features of the invention disclosed herein can be implemented in software, according to one embodiment.

FIG. 5 depicts a block diagram of a computer system 510 suitable for implementing aspects of the systems described herein. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Global lock manager 151 may be embedded, encoded, or otherwise stored in or on system memory 517. Applications and/or software modules, such as the software modules discussed herein, resident with computer system 510 are generally stored on and accessed from a computer-readable storage medium, such as a hard disk drive (e.g., fixed disk 544), an optical drive (e.g., optical drive 540), or other computer-readable storage medium. Additionally, computer system 510 can contain a cache, such as cache 130 described herein.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the systems described herein. The devices and subsystems can be interconnected in different ways from that shown in FIG. 5. The operation of a computer system such as that shown in FIG.

5 is readily known in the art and is not discussed in detail in this application. Code to implement the modules of the systems described herein can be stored in computer-readable storage media such as one or more of system memory 517, fixed disk 544, or optical disk 542. The operating system provided on computer system 510 may be MS-DOS®, MS-WINDOWS®, UNIX®, Linux®, AIX®, or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Example Computer System

Figure 6:
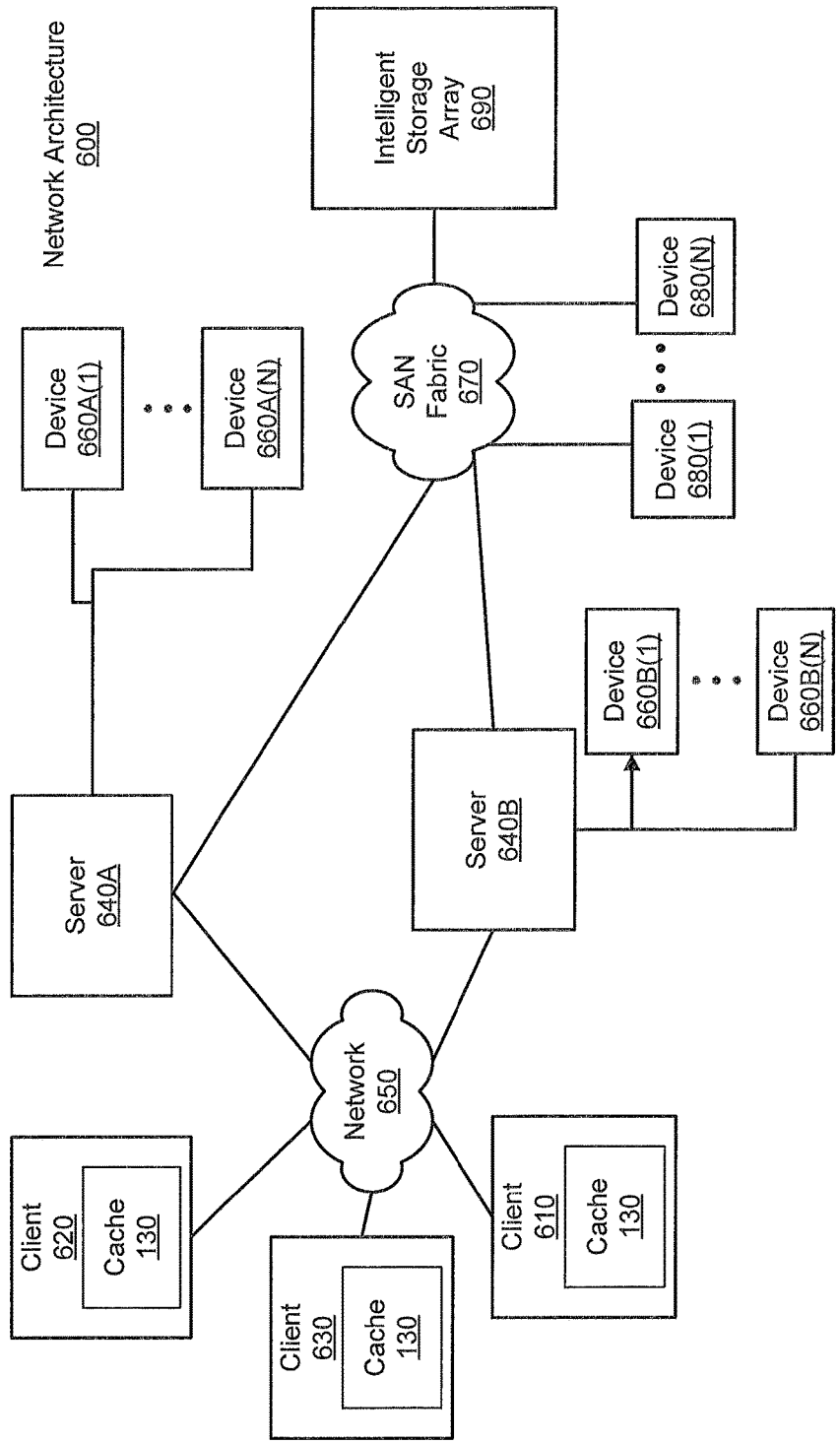
FIG. 6 is a block diagram of a networked system, illustrating how various computing system node(s) can communicate via a network, according to one embodiment.

FIG. 6 is a block diagram depicting a network architecture 600 in which client systems 610, 620 and 630, as well as storage servers 640A and 640B (any of which can be implemented using computer systems 610, 620, and/or 630), are coupled to a network 650, which can be the same network as networks 160(1)-160(3). Additionally, client systems 610, 620, and 630 are depicted as containing a cache 130. Storage server 640A is further depicted as having storage devices 660A(1)-(N) directly attached, and storage server 640B is depicted with storage devices 660B(1)-(N) directly attached. While not expressly depicted in FIG. 6, it is understood that centralized operations manager 190 may be included on any storage server, such as storage server 640B, and may also be split among one or more servers, such as storage servers 640A and 640B. Storage servers 640A and 640B are also connected to a SAN fabric 670, although connection to a storage area network is not required for operation. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method, apparatus or device can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the systems described herein are not limited to the Internet or any particular network-based environment.

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a non-transitory machine-readable or non-transitory computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media, including any such type of non-transitory computer-readable storage media, may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method, comprising:
    receiving a request for a data object, wherein the request is received by a first node of a cluster of nodes;
    querying a global lock manager to determine if a second node is a lock owner of the data object, wherein
        the cluster of nodes comprises the second node,
        the second node comprises a local cache, and
        the first node and the second node are separate computing devices;
    determining that the second node is the lock owner and that the data object is available in the local cache of the second node;
    determining that a third node has a shared lock on the data object;
    waiting for a third node to complete a pending operation on the data object pursuant to the shared lock;
    after the third node has completed the pending operation, requesting the data object from the local cache of the second node;
    in response to requesting the data object from the local cache of the second node, the data object is pushed to the first node from the local cache of the second node, wherein
        the data object is pushed to the first node, from the local cache of the second node, after the second node completes one or more pending operations on the data object; and
    subsequent to the second node receiving an acknowledgement from the first node, exclusively transferring an exclusive lock to the first node, wherein
        the exclusive lock is transferred exclusively to the first node subsequent to the second node receiving the acknowledgement from the first node indicating that the first node has received the data object.

2. The method of claim 1, further comprising:
    prior to requesting the data object from the second node, determining whether the second node has an exclusive lock or a shared lock on the data object.

3. The method of claim 2, further comprising:
    sending the acknowledgment to the second node, wherein the acknowledgment is sent in response to receiving the data object.

4. The method of claim 1, further comprising:
    receiving the exclusive lock associated with the data object, wherein
        the receiving the exclusive lock is performed subsequent to the receiving the data object.

5. The method of claim 1, further comprising:
    subsequent to the requesting, receiving the data object from the local cache of the second node.

6. The method of claim 1, further comprising:
    a storage area network ("SAN"), wherein
        the SAN is communicatively coupled the cluster via one or more networks,
        the SAN comprises a plurality of storage devices,
        a network storage device comprises a copy of the data object, and
        the receiving the data object from the second node is more efficient than receiving the copy from the network storage device.

7. The method of claim 1, where
    the acknowledgement further indicates that the first node has received the data object without any errors.

8. A computer system comprising:
    a processor; and
    a memory coupled to the processor and configured to store instructions executable by the processor, the instructions configured to
        receive a request for a data object, wherein
            the request is received by a first node of a cluster of nodes;
        query a global lock manager to determine if a second node is a lock owner of the data object, wherein
            the cluster of nodes comprises the second node,
            the second node comprises a local cache, and
            the first node and the second node are separate computing devices;
        determine that the second node is the lock owner and that the data object is available in the local cache of the second node;
        determine that a third node has a shared lock on the data object;
        wait for a third node to complete a pending operation on the data object pursuant to the shared lock;
        after the third node has completed the pending operation, request the data object from the local cache of the second node;
        in response to requesting the data object from the local cache of the second node, the data object is pushed to the first node from the local cache of the second node, wherein
            the data object is pushed to the first node, from the local cache of the second node, after the second node completes one or more pending operations; and
        subsequent to the second node receiving an acknowledgement from the first node, exclusively transferring an exclusive lock to the first node, wherein
            the exclusive lock is transferred exclusively to the first node subsequent to the second node receiving the acknowledgement from the first node indicating that the first node has received the data object.

9. The computer system of claim 8, wherein the instructions are further configured to:
    prior to requesting the data object from the second node, determine whether the second node has an exclusive lock or a shared lock on the data object.

10. The computer system of claim 9, wherein the instructions are further configured to:
    send the acknowledgment to the second node, wherein the acknowledgment is sent in response to receiving the data object.

11. The computer system of claim 8, wherein the instructions are further configured to:
receive the exclusive lock associated with the data object, wherein
the receiving the exclusive lock is performed subsequent to receiving the data object.

12. The computer system of claim 8, wherein the instructions are further configured to:
subsequent to requesting the data object from the local cache of the second node, receive the data object from the local cache of the second node.

13. The computer system of claim 8, further comprising:
a storage area network ("SAN"), wherein
the SAN is communicatively coupled the cluster via one or more networks,
the SAN comprises a plurality of storage devices,
a network storage device comprises a copy of the data object, and
receiving the data object from the second node is more efficient than receiving the copy from the network storage device.

14. A non-transitory computer-readable storage medium configured to store program instructions that, when executed on a processor, are configured to cause the processor to perform a method comprising:
receiving a request for a data object, wherein
the request is received by a first node of a cluster of nodes;
querying a global lock manager to determine if a second node is a lock owner of the data object, wherein
the cluster of nodes comprises the second node,
the second node comprises a local cache, and
the first node and the second node are separate computing devices;
determining that the second node is the lock owner and that the data object is available in the local cache of the second node;
determining that a third node has a shared lock on the data object;
waiting for a third node to complete a pending operation on the data object pursuant to the shared lock;
after the third node has completed the pending operation, requesting the data object from the local cache of the second node;
in response to requesting the data object from the local cache of the second node, the data object is pushed to the first node from the local cache of the second node, wherein
the data object is pushed to the first node, from the local cache of the second node, after the second node completes one or more pending operations on the data object; and
subsequent to the second node receiving an acknowledgement from the first node, exclusively transferring an exclusive lock to the first node, wherein
the exclusive lock is transferred exclusively to the first node subsequent to the second node receiving the acknowledgement from the first node indicating that the first node has received the data object.

15. The non-transitory computer-readable storage medium of claim 14, wherein the method further comprises:
prior to requesting the data object from the second node, determining whether the second node has an exclusive lock or a shared lock on the data object.

16. The non-transitory computer-readable storage medium of claim 15, wherein the method further comprises:
sending the acknowledgment to the second node, wherein
the acknowledgment is sent in response to receiving the data object.

17. The non-transitory computer-readable storage medium of claim 14, wherein the method further comprises:
receiving the exclusive lock associated with the data object, wherein
the receiving the exclusive lock is performed subsequent to the receiving the data object.

18. The non-transitory computer-readable storage medium of claim 14, wherein the method further comprises:
subsequent to the requesting, receiving the data object from the local cache of the second node.

* * * * *